(12) United States Patent
Ayachitula et al.

(10) Patent No.: US 7,616,113 B2
(45) Date of Patent: Nov. 10, 2009

(54) SPATIALLY LOCATING RFID TAGS USING MULTIPLE READERS AND CORRECTION FACTORS

(75) Inventors: Naga A. Ayachitula, Elmsford, NY (US); Stephen Brady, White Plains, NY (US); Shu-Ping Chang, Shrub Oak, NY (US); James S. Lipscomb, Yorktown Heights, NY (US); Frank L. Stein, Vienna, VA (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 11/619,637

(22) Filed: Jan. 4, 2007

(65) Prior Publication Data

US 2008/0165058 A1 Jul. 10, 2008

(51) Int. Cl.
*G08B 1/08* (2006.01)
(52) U.S. Cl. ............................... 340/539.13; 340/572.1
(58) Field of Classification Search .............. 340/539.1, 340/572.4, 10.1, 572.1
See application file for complete search history.

(56) References Cited

U.S. PATENT DOCUMENTS

| | | | |
|---|---|---|---|
| 6,456,239 B1 | 9/2002 | Werb et al. | |
| 6,556,942 B1 | 4/2003 | Smith | |
| 6,963,289 B2 | 11/2005 | Aljadeff et al. | |
| 7,030,761 B2 | 4/2006 | Bridgelall et al. | |
| 2005/0229227 A1 | 10/2005 | Rogers | |
| 2005/0280574 A1 | 12/2005 | Tafas et al. | |
| 2006/0038077 A1 | 2/2006 | Olin et al. | |
| 2006/0044147 A1 | 3/2006 | Knox et al. | |
| 2006/0092072 A1 | 5/2006 | Steiner | |
| 2006/0111123 A1 | 5/2006 | Nerat | |

*Primary Examiner*—Jeffery Hofsass
(74) *Attorney, Agent, or Firm*—Cantor Colburn LLP; Ken Corsello

(57) ABSTRACT

An embodiment of the invention is a method of accurately determining the spatial location of an RFID tag in two-dimensions or three-dimensions. The method utilizes a plurality of RFID readers to make a plurality of distance, direction, and or time-of-flight determinations. Such determinations are made by sending a request signal from one of the plurality of RFID readers and listening for a response signal from an RFID tag received at each of the plurality of RFID readers. Correction factors are then determined and the time-of-flight factors adjusted. The adjusted time-of-flight factors are then used to determine more accurately the distances between the RFID tag and each of the plurality of RFID readers. These more accurate distance measurements are then used to determine the spatial location of the RFID tag.

20 Claims, 13 Drawing Sheets

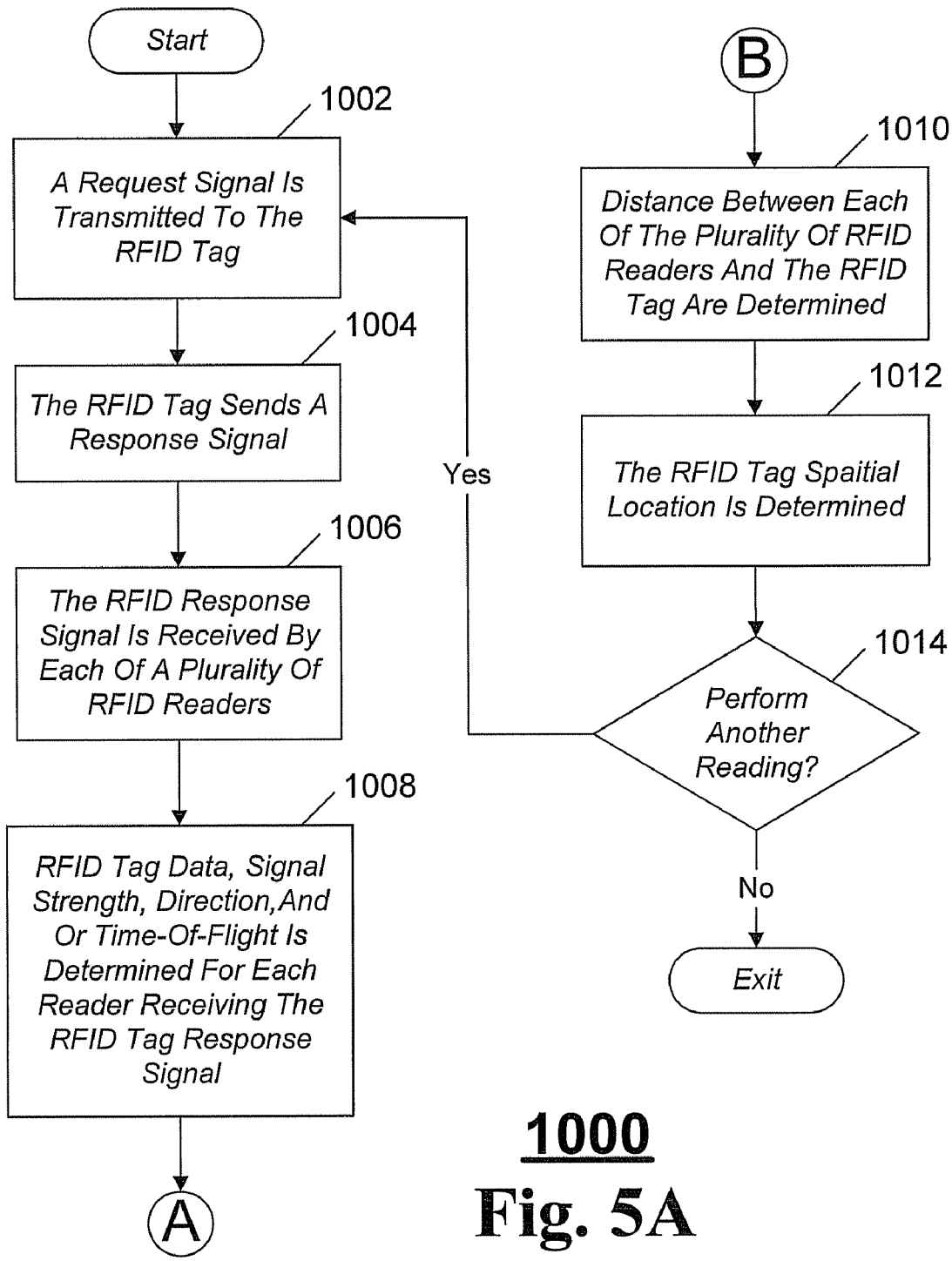

1000

1000

1000

1000

SPATIALLY LOCATING RFID TAGS USING MULTIPLE READERS AND CORRECTION FACTORS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

An embodiment of the invention relates to a method of accurately determining the spatial location of an RFID tag in two-dimensions or three-dimension. More particularly, the method utilizes a plurality of RFID readers to make a plurality of distance, direction, and or time-of-flight determinations. Such determinations are made by sending a request signal from one of the plurality of RFID readers and listening for a response signal from an RFID tag received at each of the plurality of RFID readers. Correction factors are then determined and the time-of-flight factors adjusted. The adjusted time-of-flight factors are then used to determine more accurately the distances between the RFID tag and each of the plurality of RFID readers. These more accurate distance measurements are then used to determine the spatial location of the RFID tag.

2. Description of Background

Before our invention physically locating an RFID tag in a warehouse was difficult and very imprecise. Radio tags (also referred to as RFID tags) are a technology that, when queried at radio frequency with a request signal reply at radio frequency with a response signal. RFID tags may be 'active' with their own power source or 'passive', drawing power from the request signals. The request signals and response signals may be of a fixed preset code or may contain dynamically generated information.

One problem with current RFID tag location schemes is that in a warehouse full of RFID tagged items RFID readers may capture RFID tagged inventory items that are on hand nearby but cannot precisely pinpoint the location of the items. In most cases RFID readers only capture the encoded data on the RFID tag response signal and maybe the RFID tag signal strength, which can only be used for a very rough approximation of the distance (not direction) between the RFID reader and the responding RFID tag.

Not being able to quickly locate inventory in a warehouse results in delays in inventory handling and as such problems in supply-chain management. As an example, when items are hard to find, warehouse shipments may be delayed. Supply chain delays may cause unintended consequences. First, the supply-chain can be delayed with immediate consequences of manpower and delays to find missing inventory items. Next there can be consequences resulting from low inventory levels downstream in the stores. Then finally upstream supplier consequences can occur resultant from the delay and inventory level problems causing suppliers to ship too many or too few inventory items to meet phantom inventory requirements.

RFID response signal strength can be used as a rough estimate in determining the distance between an RFID tag and an RFID reader, but cannot identify the specific direction from the RFID reader. In addition, the signal strength is not always accurate. Problem related to signal strength measurements can be that the RFID response signal may be reflected and that intervening objects (radio frequency (RF) obstacles) may block, degrade, interfere with, and or modify the RFID response signal strength. As such, RFID response signal strength alone is not a good enough measurement to reliably and precisely determine the location of a specific RFID tag.

Another method of determining the distance between an RFID tag and an RFID reader is by determining the time-of-flight starting when an RFID reader sends a request signal and ending when the RFID reader receives a response signal from an RFID tag. In this regard, an RFID reader can use the time-of-flight determination to calculate the distance between the RFID reader and the RFID tag. The problem here is that there is latency between the request signal and response signal. This latency occurs while the RFID tag is processing the received request signal. Factors such as manufacture specifications, temperature, and RFID tag characteristics all contribute to a turn-around delay in the RFID tag response signal.

This turn-around delay can have a profound effect on the ability to determine the distance between the RFID reader and the RFID tag. For example, if the turn-around delay in the RFID tag response signal takes an extra microsecond to reply beyond what the RFID reader is estimating, then the RFID reader will estimate the RFID tag to be about 150 meters farther away than it really is.

SUMMARY OF THE INVENTION

The shortcomings of the prior art are overcome and additional advantages are provided through the provision of a method of spatially locating RFID tags. The method comprising transmitting a request signal from at least one of a plurality of RFID readers; receiving an RFID tag response signal at the plurality of RFID readers; determining a plurality of time-of-flight factors; determining a plurality of correction factors; adjusting the plurality of time-of-flight factors by applying the plurality of correction factors to the plurality of time-of-flight factors; determining based in part on the plurality of time-of-flight factors a plurality of distances between each of the plurality of RFID readers and the RFID tag; and determining based in part on the plurality of distances the spatial location of the RFID tag.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which more accurately determines the spatial location of an RFID tag in two or three-dimensions.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 5A illustrates one example of a routine for determining the spatial location of an RFID tag;

The detailed description explains the preferred embodiments of the invention, together with advantages and features, by way of example with reference to the drawings.

DETAILED DESCRIPTION OF THE INVENTION

Figure 1A:
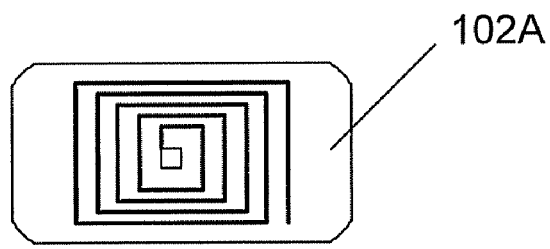
FIG. 1A illustrates one example of an RFID tag having a single antenna.

Turning now to the drawings in greater detail, it will be seen that in FIG. 1A there is radio frequency identification (RFID) tag 102A having a single antenna.

Figure 1B:
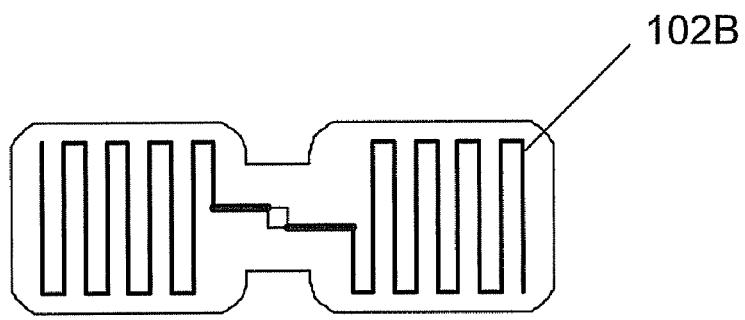
FIG. 1B illustrates one example of an RFID tag having two antennas.
Figure 1C:
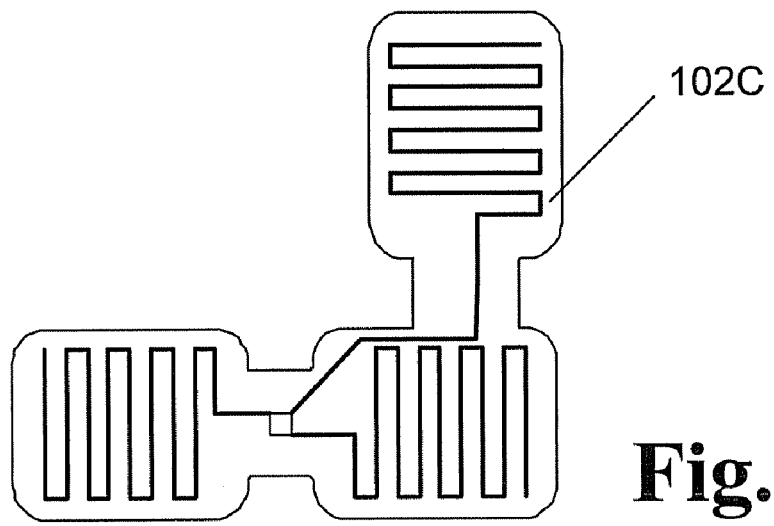
FIG. 1C illustrates one example of an RFID tag having three antennas.

Referring to FIG. 1B there is illustrated one example of an RFID tag 102B having two antennas. Referring to FIG. 1C there is illustrated one example of an RFID tag 102C having three antennas. For purposes of disclosure RFID tag 102A, RFID tag 102B, and RFID tag 102C can be referred to as RFID tag 102. Furthermore, RFID reader 202A, RFID reader 202B, RFID reader 202C, and RFID reader 202D can be referred to as RFID reader 202. In addition RFID 102 and RFID reader 202 can be of a make, model, and or manufacture of those RFID tags and RFID reader commercially available, of proprietary design, custom designed, and or generally found in the technology marketplace.

In an exemplary embodiment RFID tag 102 can be of a 'passive' type, 'active' type, and or other type of RFID tag. 'Passive' type RFID tags typically have no power source, instead relying on being energized by the RFID reader 202 interrogating request signals. As such, for 'passive' RFID tags, the range between the RFID tag 102 and the RFID reader 202 are typically relative small compared to the range of 'active' type RFID tag 102.

'Active' type RFID tags 102 typically have a power source within, accessible to, or associated with the RFID tag 102. As such, the 'active' RFID tag 102 is capable of responding to RFID reader 202 request signals with a more powerful response signal. This typically translates into a much great distance or range between the RFID tag 102 and the RFID reader 202. Cost, benefit, and other factors can play a role in deciding which type of tag 'passive', 'active', or other type of RFID tag is best suited for the application.

Figure 1D:
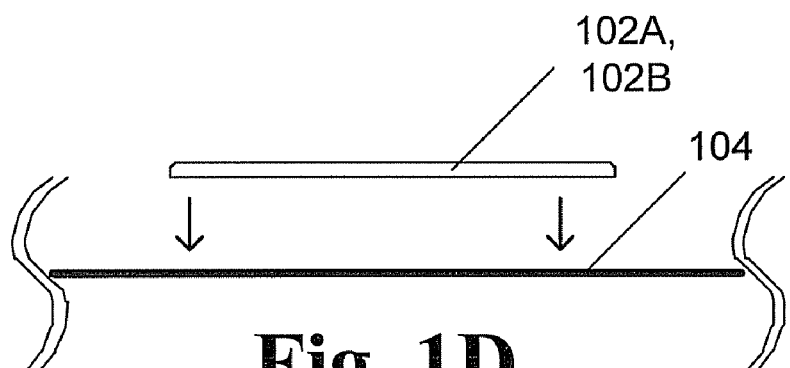
FIG. 1D illustrates one example of an RFID tag being placed on a package such that the antenna is planar.

RFID tag 102 orientation, with respect to RFID reader 202 antenna orientation, can also influence the RFID tag 102 received signal strength. Referring to FIG. 1D there is illustrated one example of an RFID tag 102 being placed on a package 104 such that the antenna is planar. In this orientation the RFID tag 102 response signal strength, at an RFID reader 202, can vary based on the orientation of the RFID tag 102 planar antenna orientation with respect to RFID reader 202 antenna orientation.

Figure 1E:
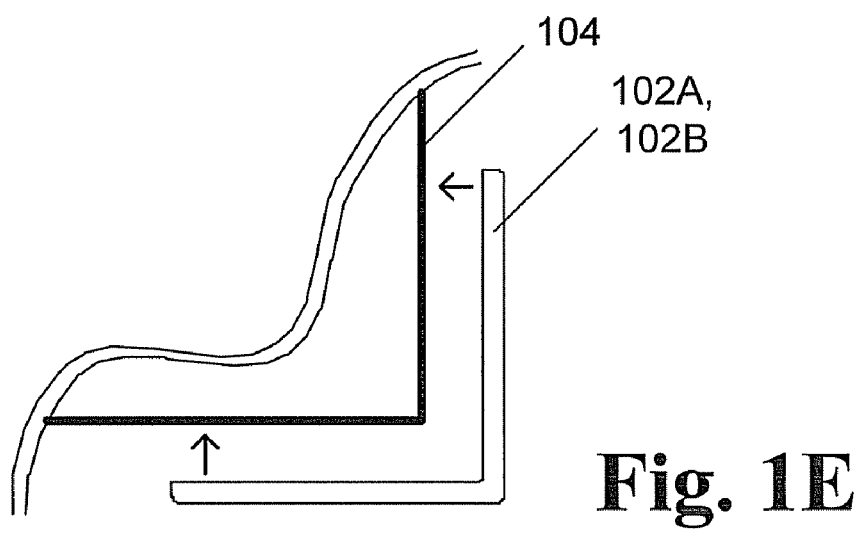
FIG. 1E illustrates one example of an RFID tag being placed on a package such that the antenna is two axis non-planar.

To improve RFID tag 102 response signals RFID tag 102 antenna can be orientated in a non-planar orientation. Referring to FIG. 1E there is illustrated one example of an RFID tag 102 being placed on a package 104 such that the antenna is two-axis non-planar and as long as at least one antenna surface is not perpendicular to the RFID reader 202 antenna RFID tag 102 response signal strength should be improved, either by using the antennas together at the same time or by switching successively between them to obtain the best send/receive signal strength to the reader. For example, non-directional antennas may be imperfect, having dead directions, or an antenna may be blocked from a good view of the reader by the product on which the antenna is attached.

Figure 1F:
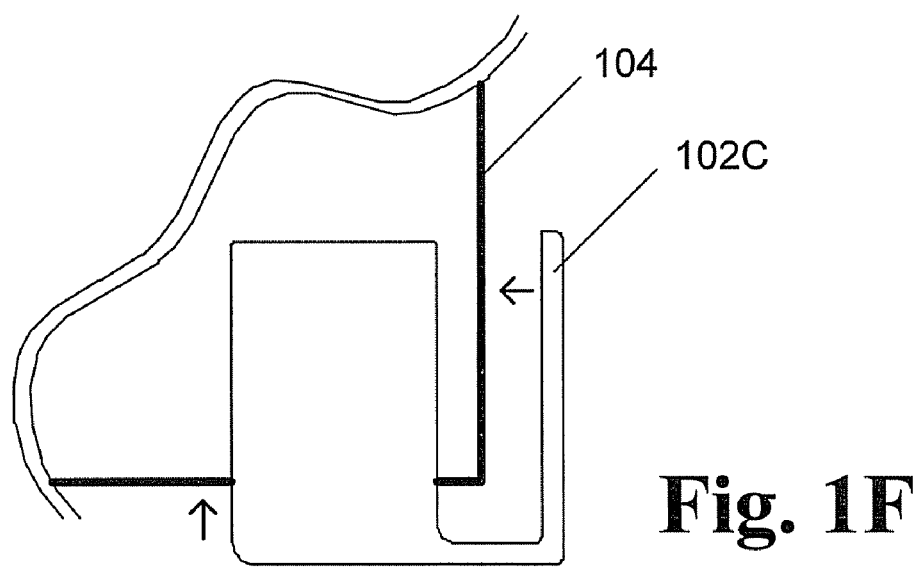
FIG. 1F illustrates one example of an RFID tag being placed on a package such that the antenna is three axis non-planar.

To better insure at least one of the antenna surfaces is not perpendicular (maximizing the received response signal strength) the RFID tag 102 antennas can be orientated on several sides of a package 104. Referring to FIG. 1F there is illustrated one example of an RFID tag 102 being placed on a package such that the antenna is three-axis non-planar on multiple surfaces.

Figure 1G:
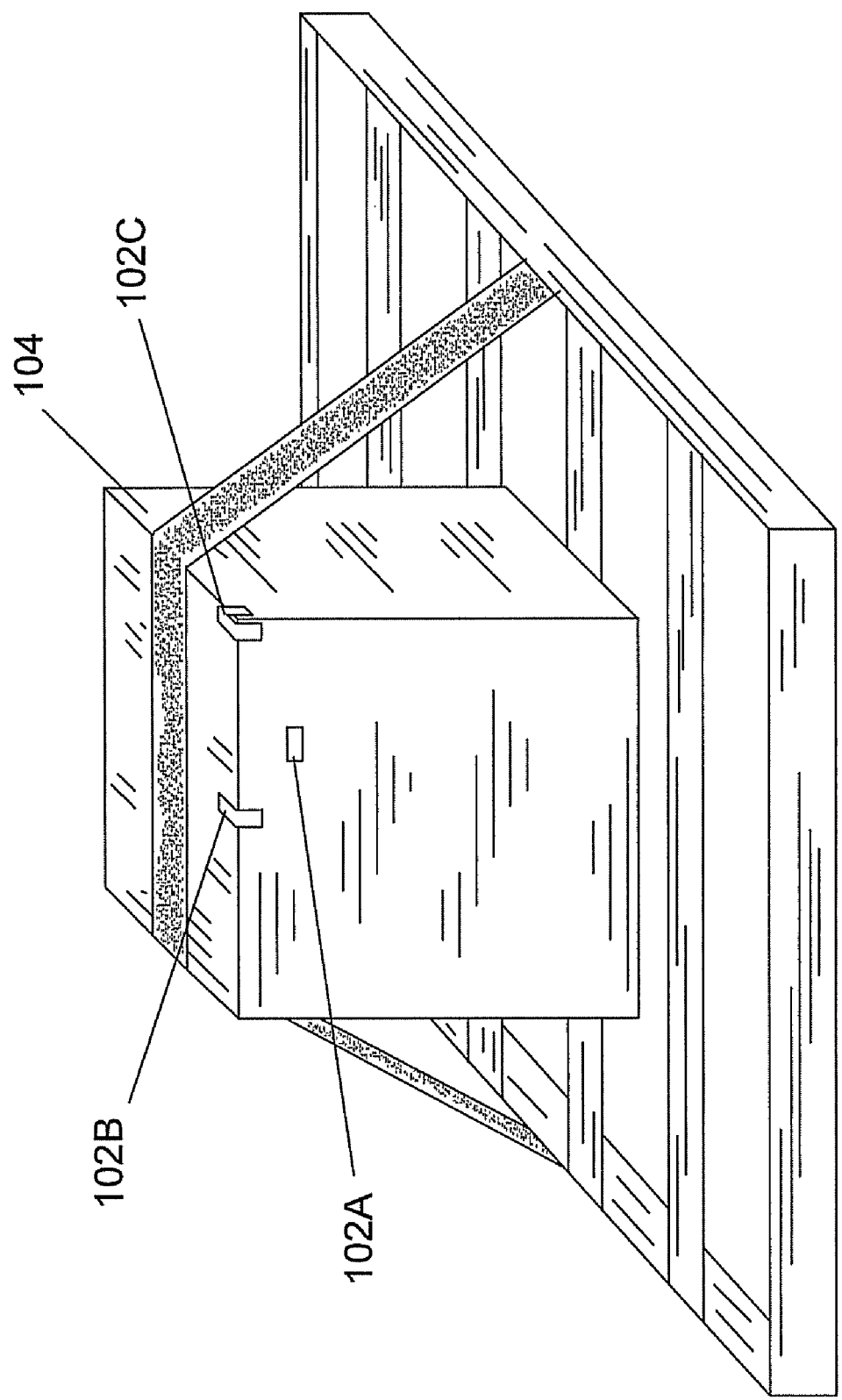
FIG. 1G illustrates one example of a plurality of RFID tags with planar and non-planar antennas being placed on a package.

Better clarified how an RFID tag 102 can be orientation on a package 104 there is illustrated in FIG. 1G one example of a plurality of RFID tags 102 with planar and non-planar antennas being placed on a package 104. In an exemplary embodiment, for example and not limitation an RFID tag 102A is shown as a planar antenna on the surface of package 104. An RFID tag 102B is shown as a non-planar antenna on two adjacent surfaces of package 104. Lastly an RFID tag 102C is shown as a non-planar antenna on three adjacent surfaces of package 104.

Figure 2A:
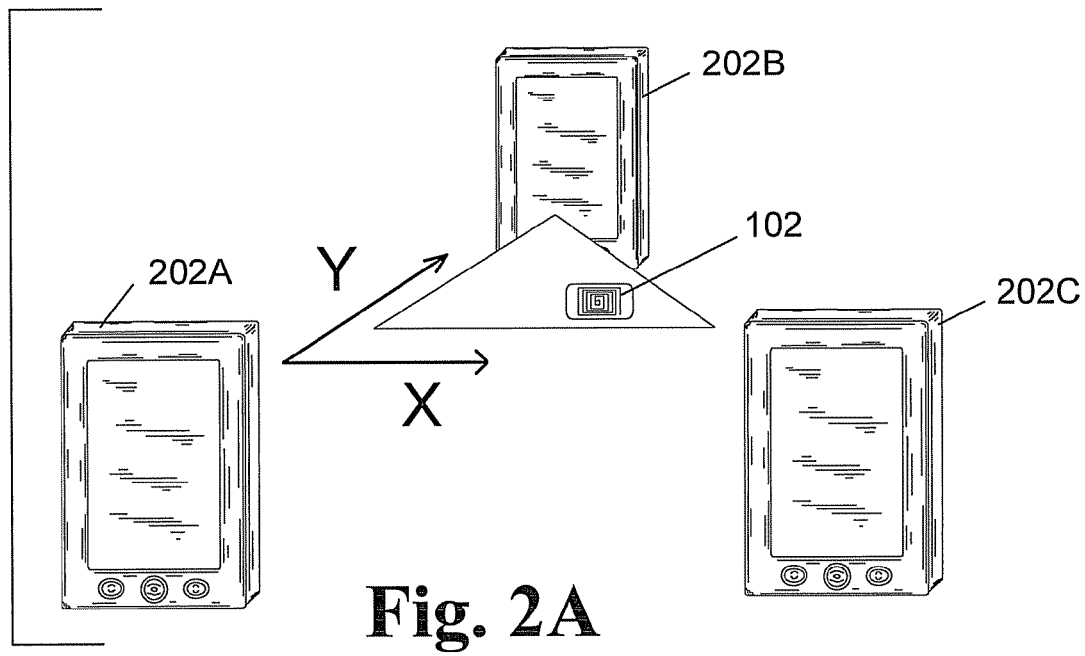
FIG. 2A illustrates one example of a plurality of RFID readers positioned to spatially determine the location of an RFID tag in a two-dimensional plane.

Referring to FIG. 2A there is illustrated one example of a plurality of RFID readers 202A-202C positioned to spatially determine the location of an RFID tag 102 in a two-dimensional plane. In an exemplary embodiment, for example and not limitation, at least three RFID readers 202 are needed to be able to determine the spatial location of an RFID tag 102 in a two-dimensional plane denoted as an X-axis and Y-axis. An RFID tag 102 is shown within the scanable region. RFID readers 202A-202C are located at the vertices of the scanable region.

Figure 2B:
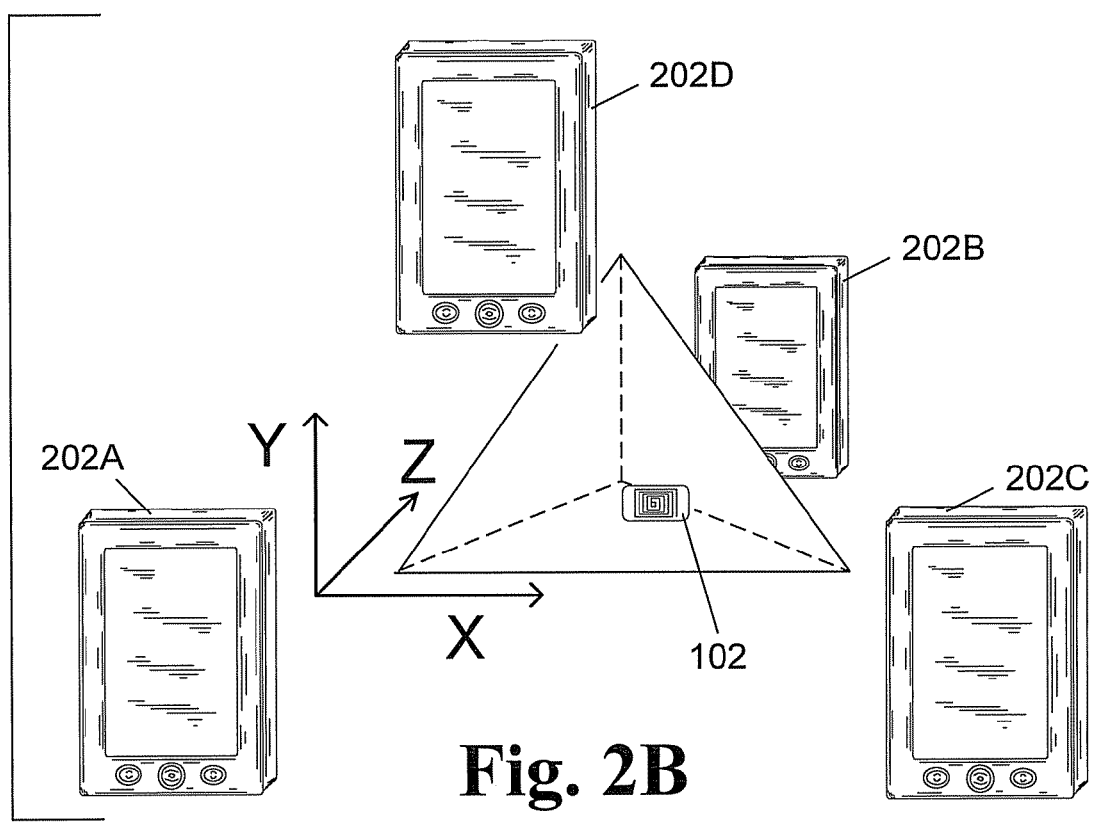
FIG. 2B illustrates one example of a plurality of RFID readers positioned to spatially determine the location of an RFID tag in a three-dimensional space.

Referring to FIG. 2B there is illustrated one example of a plurality of RFID readers 202A-202D positioned to spatially determine the location of an RFID tag 102 in a three-dimensional space. In an exemplary embodiment, for example and not limitation, a minimum of four RFID readers 202 are needed to be able to determine the spatial location of an RFID tag 102 in a three-dimensional space denoted as an X-axis, Y-axis, and Z-axis. An RFID tag 102 is shown within the scanable region. RFID readers 202A-202D are located at the vertices of the scanable region.

Figure 2C:
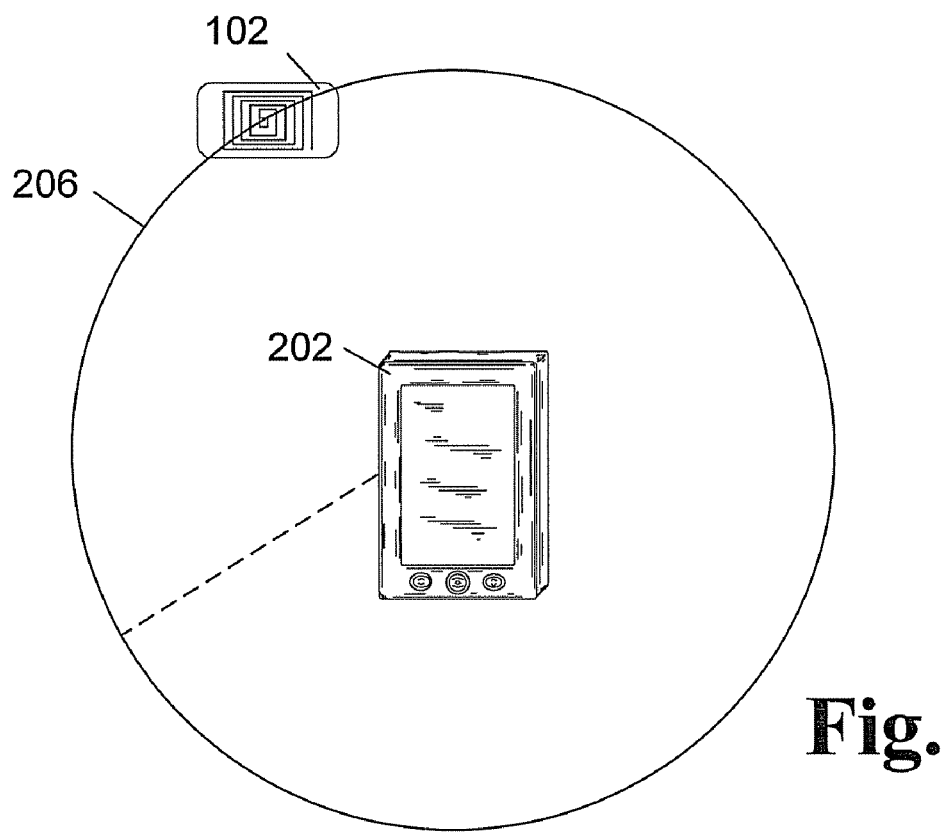
FIG. 2C illustrates one example of an RFID reader with a non-directional antenna.

Referring to FIG. 2C there is illustrated one example of an RFID reader with a non-directional antenna. In an exemplary embodiment, when a reader 202 transmits a request signal and RFID tag 102 responds with a response signal, a calculation to determine the time-of-flight starting with the sending of the request signal from the RFID reader 202 and ending with the receiving at the RFID reader 202 of a response signal sent from the RFID tag 102 can be determined. The time-of-flight measurement in combination with correction factors and the knowledge that radio waves travel at about 300,000,000 meters per second, which is 150 meters per micro-second total time and distance for the signal to travel in opposing directions towards and then away from the antenna to enable an approximation of the RFID tag 102 distance from the RFID reader 202. In FIGS. 2C, 2D, 3A, and 3B this distance from the RFID reader 202 is denoted as an RFID tag distance 206A, 206B, 206C, and or 206D. For disclosure purposes RFID tag distance 206A, 206B, 206C, and or 206D can be referred to as RFID tag distance 206.

In the exemplary embodiment of FIG. 2C there is illustrated an RFID reader 202 sending a response signal, which is received by RFID tag 102. In response the RFID tag 102 processes the RFID reader 202 request signal and sends an RFID tag 102 response signal. The response signal is received at the RFID reader 202. A time-of-flight factor with correction factors is determined, and the RFID tag 102 distance from the RFID reader 202 is determined and illustrated as RFID tag distance 206. Since in this exemplary embodiment an RFID reader 202 has a non-directional antenna the RFID tag distance 206 can be determine but the specific direction cannot. In this regard, the RFID tag 102 spatial location on RFID tag distance 206 can be in any of a 360 degree circle around the RFID reader 202 and is represented by a circle.

Figure 2D:
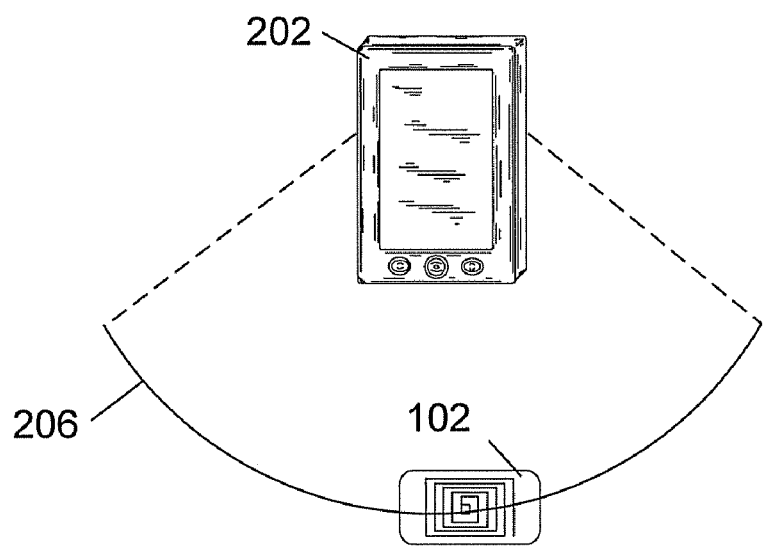
FIG. 2D illustrates one example of an RFID reader with a directional antenna.

To limit the RFID tag distance 206 to something less than a 360 degree circle around the RFID reader 202 an thus have a better approximation of the spatial location of the RFID tag 102 an RFID reader 202 with a directional antenna can be employed. Referring to FIG. 2D there is illustrated one example of an RFID reader 202 with a directional antenna. In this regard, FIG. 2D illustrates a much less than 360 degree circle RFID tag distance 206. By employing, in an exemplary embodiment, the use of an RFID reader 202 with a directional antenna a much better approximation of the RFID tag 102 spatial location can be determined quicker based in part on the fact that the degrees of freedom have been limited by the directional antenna.

Figure 3A:
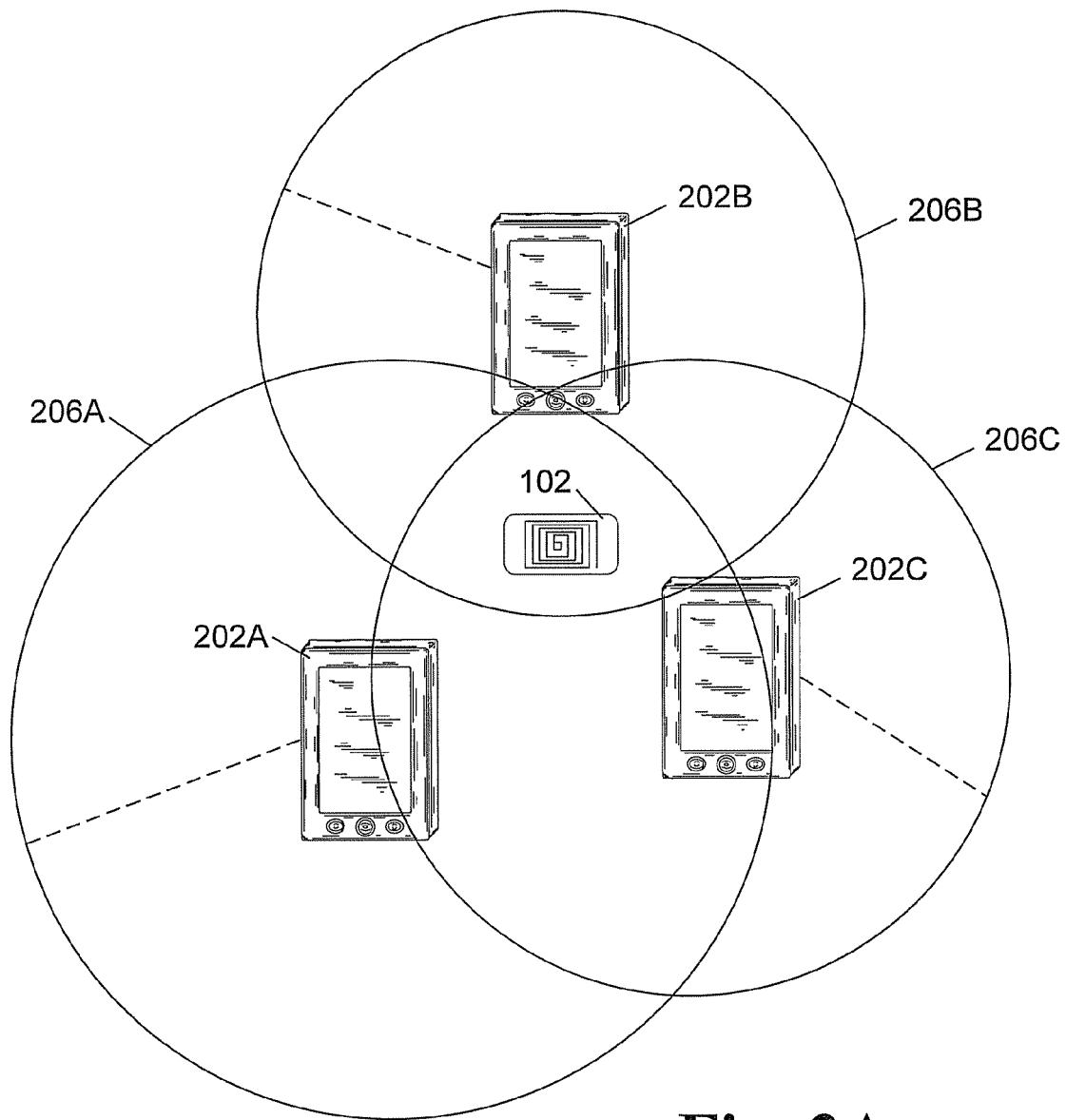
FIG. 3A illustrates one example of a plurality of RFID readers positioned to spatially determine the location of an RFID tag prior to correction factor adjustments.

Referring to FIG. 3A there is illustrated one example of a plurality of RFID readers positioned to spatially determine the location of an RFID tag 102 prior to correction factor adjustments. To determine the spatial location in a two-dimensional plane at least three RFID readers 202 are required. In this regard, when a request signal is transmitted from an RFID reader 202 an RFID tag 102 receives and processes the request signal. In response the RFID tag 102 sends a response signal, which is received by all of the RFID reader 202 in radio range of the RFID tag 102. For each of the RFID readers 202 a time-of-flight factor is determined and a RFID tag distance 206 can be determined.

FIG. 3A illustrates what can happen when a request signal is sent, a response signal is received, and an RFID tag distance 206 from each RFID reader 202 is determined. Ideally in order to accurately approximate the RFID tag 102 spatial location the RFID tag distances 206A-206C determined for each of the RFID readers 202 should converge and agree. Stated differently the RFID tag distance 206A-206C circles should intersect at the RFID tag 102. In FIG. 3A it is shown that in this example RFID reader 202A with determined RFID tag distance 206A has over estimated the distance to the RFID tag 102. Likewise RFID reader 202B, and 202C have also over estimated the RFID tag distance 202B, and 202C respectively.

These distance estimation errors can occur as a result of RFID tag 102 manufacturing tolerances, processing delays, temperature, and for any number of other factors. As an example if a queried RFID tag 102 encounters an extra one-microsecond delay beyond what the RFID reader 202 is expecting the overestimate of the distance from the RFID reader 202 would be approximately 150 meters. Distance estimation errors can vary between RFID tag 102 devices, models, packaging configuration, RFID tag orientation, and for many other controllable and not controllable factors. As such, spatial location of an RFID tag 102 without implementing correction factors typically produces only marginally acceptable results.

Figure 3B:
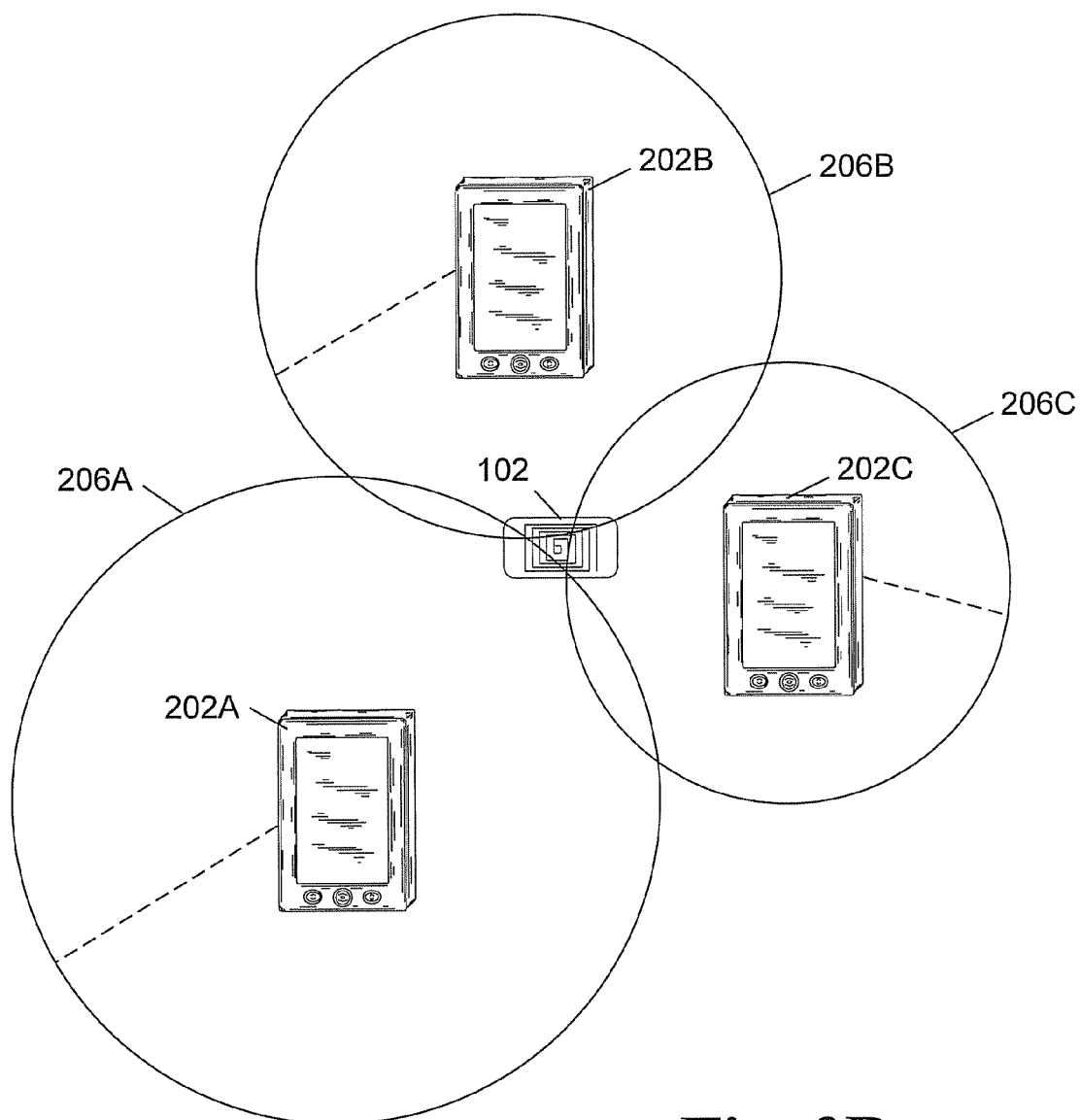
FIG. 3B illustrates one example of a plurality of RFID readers positioned to spatially determine the location of an RFID tag after correction factor adjustments.

Referring to FIG. 3B there is illustrated one example of a plurality of RFID readers positioned to spatially determine the location of an RFID tag after correction factor adjustments. In an exemplary embodiment, a better approximation of the spatial location of the RFID tag 102 can be determined if correction factors compensating for the errors introduced into the time-of-flight measurements made by each of the RFID reader 202 can be determined. In this regard, first determining the correction factors and then adjusting the time-of-flight factors for each of the RFID readers 202 will result in a better approximation of the spatial location of the RFID tag 102.

As an example and not limitation, referring to FIG. 3B if a request signal is sent by an RFID reader 202, it is received, processed, and responded to by an RFID tag 102. If during this process a one-microsecond delay is encountered and a correction factor of one-microsecond can determined and subtracted from the time-of-flight determinations the resultant distance determinations for each RFID reader 202 will be more accurate and as such the spatial location determination of the RFID tag 102 will be more accurate.

In short, by correcting the time-of-flight factors a more accurate determination of the RFID tag distance 206A-206C from each RFID reader 202A-202C can be made. FIG. 3B illustrates how in an exemplary embodiment correction factors are determined, time-of-flight factors are adjusted, and the RFID tag distances 206A, 206B, and 206C are determined. With the correction factors applied to the RFID reader 202A, 202B, and 202C time-of-flight determinations, the corresponding RFID tag distances 206A, 202B, and 202C are determined more accurately, and as such the RFID tag distances 206A-206C intersect converging and agreeing at the RFID tag 102. In this regard, the spatial location of the RFID tag 102 can be more accurately approximated.

Figure 4:
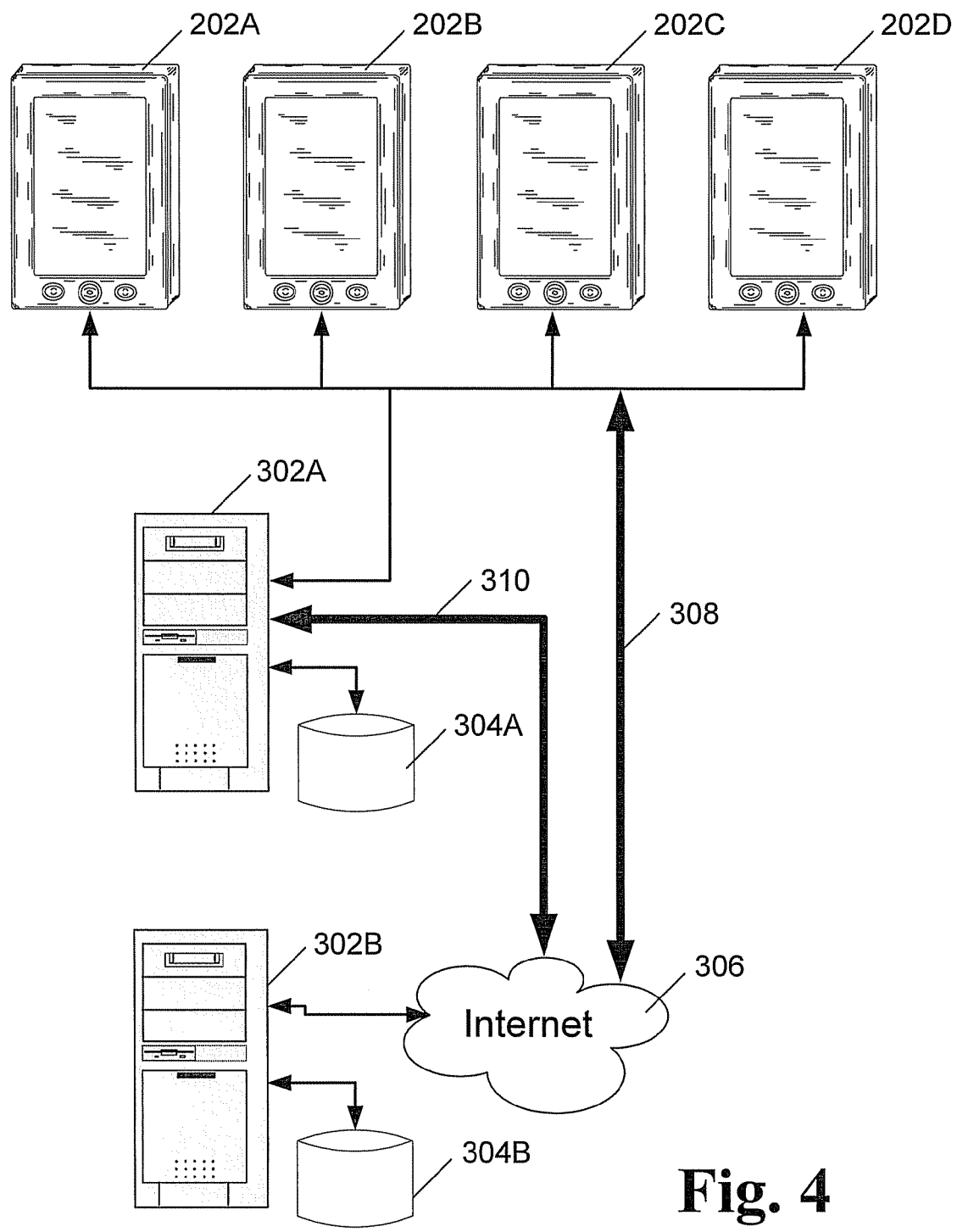
FIG. 4 illustrates one example of a plurality of RFID readers networked.

The iterative RFID reader 202 readings, RFID reader 202 configuration settings, correction factor determinations, correction factor lookup, RFID tag data, RFID tag distance determination, and or the spatial location of RFID tag 102 as well as other data processing requirements can be effectuated by implementing a system of RFID readers 202 and data processing equipment. In this regard, referring to FIG. 4 there is illustrated one example of a plurality of RFID readers networked. In an exemplary embodiment, a plurality of RFID readers 202A-202D can be networked to personal computer (PC) 302A and or networked through a global network to global network based data processing equipment 302B. In addition, databases 304A-304B can be implemented. Personal computer 302A-302B can be a server or other data processing device. For purposes of disclosure PC 302A and global network based data processing resource 302B as well as databases 304A, and 304B can be referred to as network based data processing resources.

If desired and or required at least some of the plurality of RFID readers 202A-202D can be directly connected to a global network 306 by way of network connection 308. Also if desired and or required PC 302 can be connected to a global network 306 by way of network connection 310. In this regard, if desired and or required at least some of the pluralities of RFID readers 202A-202D can data communicate with global network based data processing resources by way of network connection 310.

Referring to FIG. 5A there is illustrated one example of a routine for determining the spatial location of an RFID tag. In an exemplary embodiment, a plurality of RFID readers 202 are deployed in a geometry of at least three RFID readers 202 for two-dimensional spatial location determination of RFID tag 102, and in a geometry of at least four RFID readers 202 for three-dimensional spatial location determination of RFID tag 102. In a plurality of exemplary embodiments as many RFID readers 202 as desired and or required can be utilized. In fact, as more RFID readers 202 are deployed in the system spatial location accuracy typically increases with redundant reading. In addition, in a system with many RFID readers 202 should a specific RFID reader 202 encounter radio frequency (RF) signal blocking, interference, RF signal degradation, be located out of range of the RFID tag 102, and or otherwise generate temporary data anomalies such an RFID reader 202 data can be disregarded and an accurate spatial location determination of the RFID tag 102 still be made.

In an exemplary embodiment, a request signal is transmitted from at least one of the RFID readers 202. The RFID tag 102 receives the request signal, processes the received data, and sends a response signal. The RFID reader 202 request signal could be various types or kinds of query signals, data, identification, and or other types and or kinds of request signals. The RFID tag 102 response signal could be data, identification information, a specially formed radio pulse, a precisely timed radio pulse, and or other type and or kinds of response signals. The response signal is received by all of the RFID readers 202 in radio range of the RFID tag 102. Factors such as signal strength, direction, time-of-flight, and or other factors are determined for each of the response signals received at each of the plurality of RFID readers 202 receiving the response signal.

A plurality of processing steps can then be performed on the iteratively sampled data. As an example and not a limitation, in FIG. 5B there is illustrated one example of preset correction factors being utilized to adjust the time-of-flight factors and thus the RFID tag distances 206 determinations for each of the plurality of readers 202 to improve the accuracy of the spatial location determination of RFID tag 102.

Figures 5B, 5C:
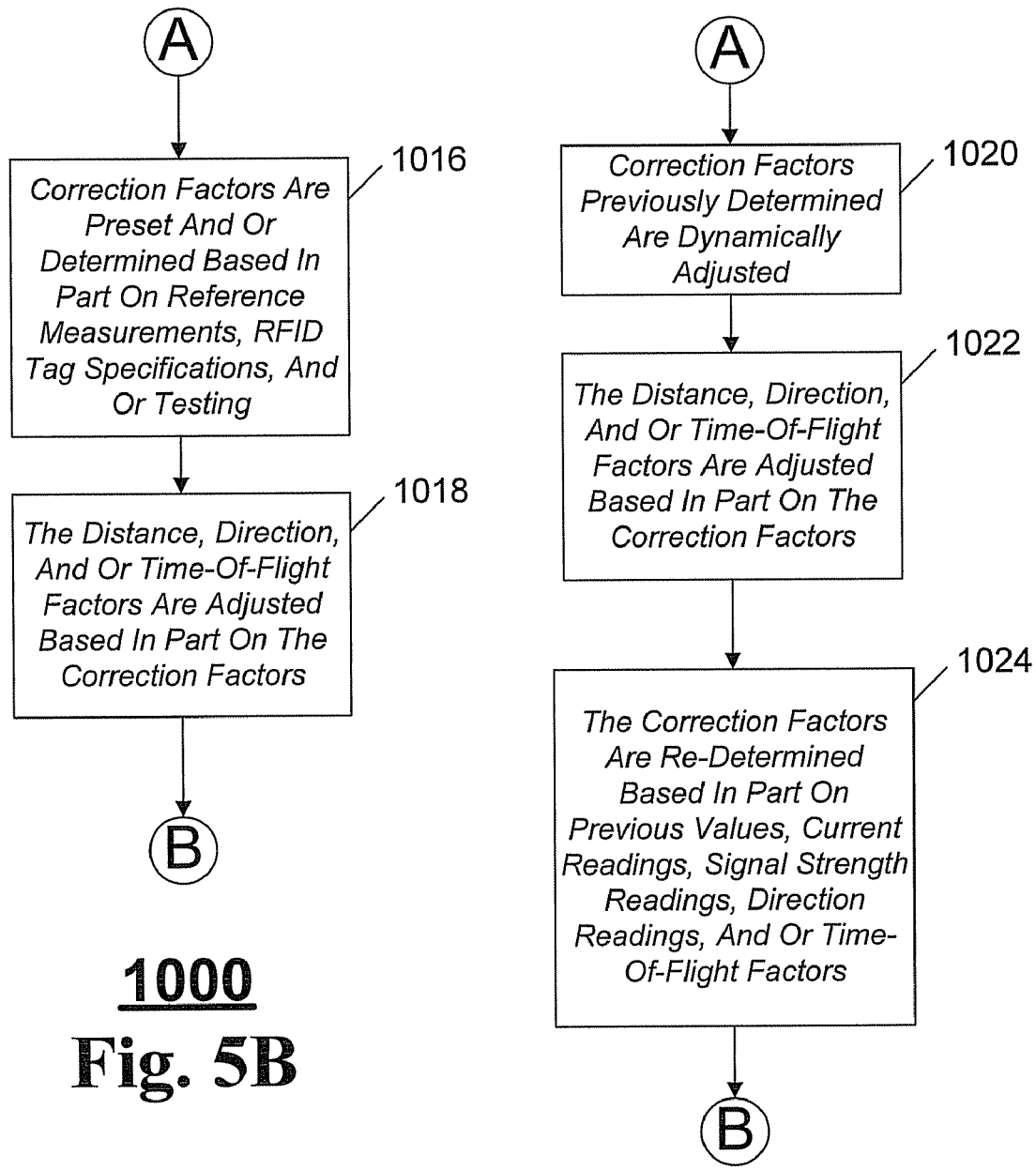
FIG. 5B illustrates one example of a routine to adjust the RFID tag readings with preset correction factors.
FIG. 5C illustrates one example of a routine to adjust the RFID tag readings based on dynamic correction factors, which are iteratively re-determined.

In FIG. 5C there is illustrated one example of using dynamically changing correction factors to adjust the time-of-flight factors and thus the RFID tag distance 206 determinations for each of the plurality of readers 202 to improve the accuracy of the spatial location determination of RFID tag 102.

Figure 5D:
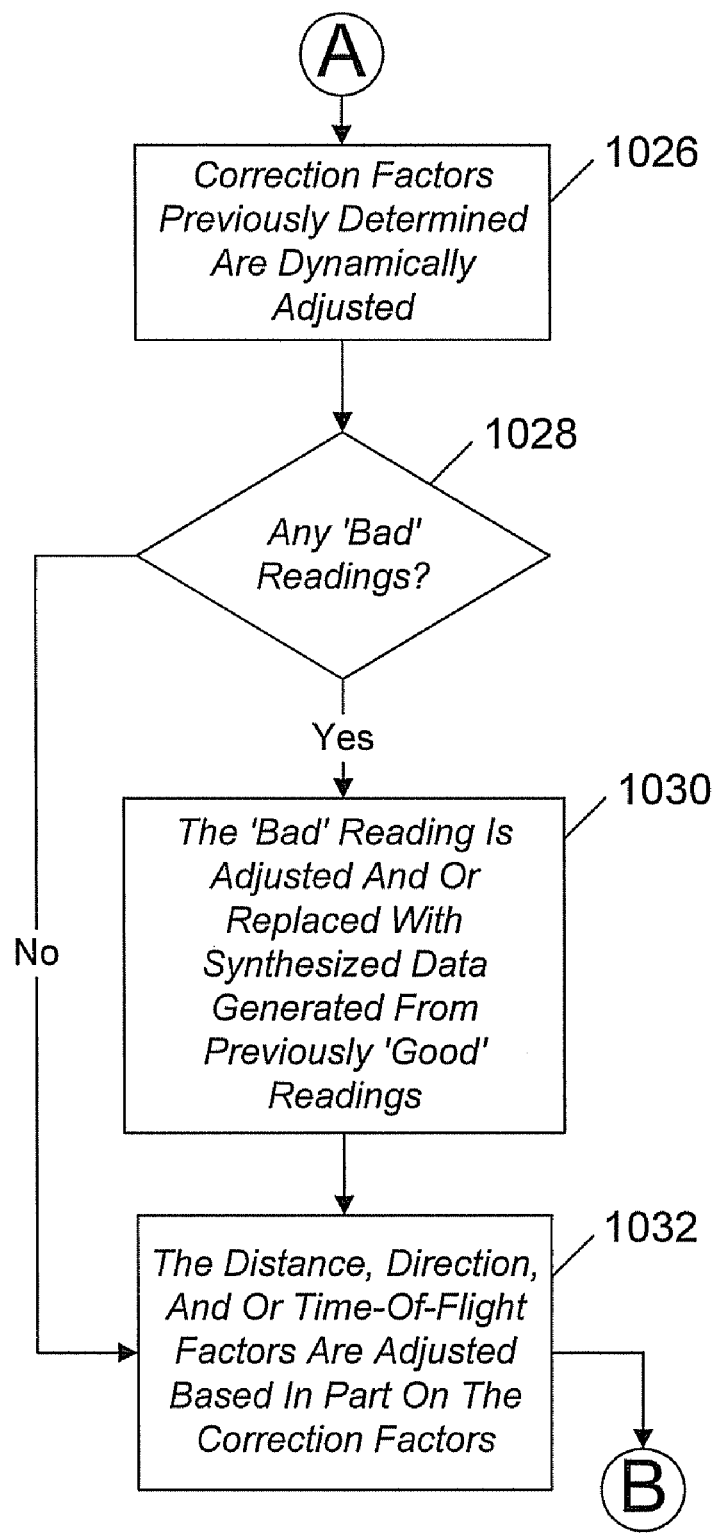
FIG. 5D illustrates one example of a routine to adjust 'bad' (also referred to as invalid data) RFID tag reading data by synthesizing 'good' (also referred to as valid data) RFID tag data.

In FIG. 5D there is illustrated one example of identifying 'bad' (also referred to as invalid data) RFID reader 202 readings and using a routine to synthesis 'good' (also referred to as valid data) readings, and then using dynamically changing correction factors to adjust the time-of-flight factors and thus the RFID tag distances 206 determinations for each of the plurality of readers 202 to improve the accuracy of the spatial location determination of RFID tag 102. 'Bad' RFID reader 202 readings can occur when RF signal path lengths change as a result of interference, RF obstacles, and or for any one of a number of other reasons. Eliminating and or synthesizing 'good' data to be use in place of 'bad' data can improve the accuracy of determining the spatial location of RFID tag 102.

Figure 5E:
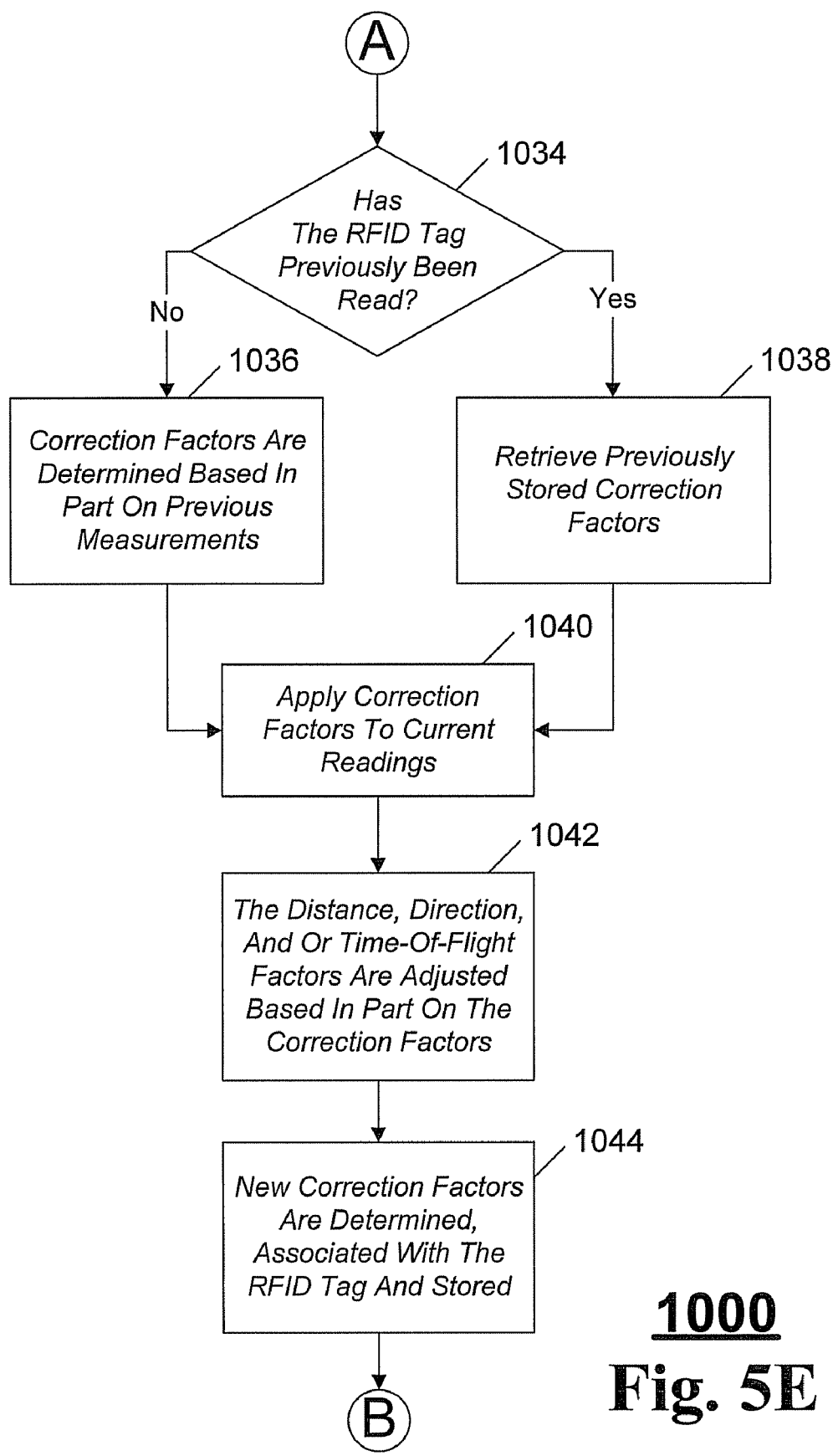
FIG. 5E illustrates one example of a routine to adjust RFID tag readings based on stored correction factors, which are iteratively determined.

In FIG. 5E there is illustrated one example of using previously stored correction factors to adjust the time-of-flight factors and thus the RFID tag distance 206 determinations for each of the plurality of readers 202 to improve the accuracy of the spatial location determination of RFID tag 102.

After the time-of-flight factors for each of the plurality of RFID readers 202 receiving the response signal from RFID tag 102 have been corrected and or otherwise adjusted the RFID tag distances 206 between each of the plurality of RFID readers 202 with valid data can be determined. Once determined the RFID tag distances 206 can be used in part to determine the spatial location of the RFID tag 102. Processing begins in block 1002.

In block 1002 a request signal from at least one of the plurality of RFID readers is transmitted. Processing then moves to block 1004.

In block 1004 an RFID tag 102 in radio range of the transmitted request signal receives, processes, and responds to the RFID reader 202 request signal by sending an RFID tag 102 response signal. Processing then moves to block 1006.

In block 1006 the RFID tag 102 response signal is received by each of the plurality of RFID readers 202 in radio range of the RFID tag 102. Processing then moves to block 1008.

In block 1008 the plurality of RFID readers 202 in radio range of the RFID tag 102 measure and or otherwise data process the response signal. Such measurement and or data processing can include, for example and not limitation, determining signal strength of the response signal, direction, and or time-of-flight of the radio signals starting with the transmission of the RFID reader 202 request signal from the RFID reader 202 and ending with the receiving of the RFID tag 102 response signal at the RFID reader 202 from the RFID tag 102. Alternatively, the plurality of RFID readers 202 can in part or in whole capture such measurements, readings, results, and or data and forward the measurements, readings, results and or data to a data processing resource such as PC 302A, global network based data processing resource 302B, and or to other desired and or required data processing resources where the relevant calculations and or determinations can be performed. In this regard processing moves to at least one of a plurality of processing options blocks 1016, 1020, 1026, 1034, and or 1046.

In a plurality of exemplary embodiments for example and not limitation, processing of the iteratively received data from the plurality of RFID readers 202 can be adjusted to improve accuracy in the spatial location of RFID tag 102. In addition, a known good spatial location of an RFID tag 102 in combination with predetermined correction factors for a plurality of RFID reader 202 can enable a newly introduced, mobile, or moved RFID reader to be auto calibrated. Each of these data processing options is detailed below in FIGS. 5B-5F. When data processing of the iteratively sampled data has been completed processing returns from each of the processing routines to block 1010.

In block 1010 the RFID tag distances for each of the plurality of RFID readers 202 having valid data are determined. Processing then moves to block 1012.

In block 1012 the RFID tag 102 spatial location is accurately determined based on the current iteratively sampled data with correction factors applied. Such RFID tag 102 spatial location determinations can be stored, data communicated, and or otherwise further processed and or utilized as required and or desired by the application. Processing then moves to decision block 1014.

In decision block 1014 a determination is made as to whether another reading is desired. If the resultant is in the affirmative that is another reading is desired then processing moves to block 1002. If the resultant is the negative that is no more readings are desired then the routine is exited.

Referring to FIG. 5B there is illustrated one example of a routine to adjust the RFID tag readings with preset correction factors. In this regard, in an exemplary embodiment measurements, readings, and data from block 1008 are used in combination with a plurality of preset and or predetermined correction factors. The result is that the distances, directions, and or time-of-flight factors are adjusted to better approximate the actual spatial location of the RFID tag 102. Processing begins in block 1016.

In block 1016 correction factors are preset and or determined based in part on reference measurements, RFID tag 102 specifications, and or testing. Processing then moves to block 1018.

In block 1018 the distance, direction, and or time-of-flight factors are adjusted based in part on the correction factors. Processing then returns to block 1010.

Referring to FIG. 5C there is illustrated one example of a routine to adjust the RFID tag readings based on dynamic correction factors, which are iteratively re-determined. In an exemplary embodiment correction factors can be determined and re-determined and dynamically adjusted based on many data readings. As such successive readings can be used to better triangulate the spatial location of the RFID tag 102. In this regard, as approximations get better and better the correction factors can be re-determined and dynamically adjusted. Processing begins in block 1020.

In block 1020 the correction factors having been previously determined are dynamically adjusted. Processing then moves to block 1022.

In block 1022 the distance, direction, and or time-of-flight factors are adjusted based in part on the correction factors. Processing then moves to block 1024.

In block 1024 the correction factors are re-determined based in part on previous values, current readings, signal strength readings, direction readings, time-of-flight factors, and or other measurements, readings, data, and or other factors. Processing returns to block 1010.

Referring to FIG. 5D there is illustrated one example of a routine to adjust 'bad' (also referred to as invalid data) RFID tag reading data by synthesizing 'good' (also referred to as good data) RFID tag data. 'Bad' RFID reader 202 readings can occur when RF signal path lengths change as a result of interference, RF obstacles, and or for any one of a number of other reasons. Eliminating and or synthesizing 'good' data to be use in place of 'bad' data can improve the accuracy of determining the spatial location of RFID tag 102. Processing begins in block 1026.

In block 1026 the correction factors having been previously determined are dynamically adjusted. Processing then moves to decision block 1028.

In decision block 1028 a determination is made as to whether or not a 'bad' reading has been received. If the resultant is in the affirmative that is a 'bad' reading has been received then processing moves to block 1030. If the resultant is in the negative that is a bad reading has not been received then processing moves to block 1032.

In block 1030 the 'bad' reading is adjusted and or replaced with synthesized data generated from previously 'good' readings. In this regard, the errant 'bad' data can be minimized, averaged, replaced, disposed of and or otherwise processed. Processing then moves to block 1032.

In block 1032 the distances, directions, and or time-of-flight factors are adjusted based in part on the correction factors. Processing then moves back to block 1010.

Referring to FIG. 5E there is illustrated one example of a routine to adjust RFID tag readings based on stored correction factors, which are iteratively determined. In an exemplary embodiment once a specific RFID tag 102 has been spatially located the correction factors can be associated with the specific RFID tag 102 and stored for future use. Associating the correction factors with the RFID tag 102 can include, for example and not limitation, associating the RFID tag 102, serial number, device ID, manufacture ID, model ID, and or other type and kinds of data associated with RFID tag, and a record of a tag previously near this location suggesting that this may be the same tag 102. As such, knowing the characteristic of an RFID tag 102 prior to attempting to spatially locate it can enhance the speed in which the spatial location of the RFID tag 102 can be determined. In addition, traits and or other characteristics between types and kinds of RFID tags 102 can also be determined, stored, and later used to more accurately determine the spatial location of the RFID tag 102. Also, if spurious distances owing to reflected signal paths are detected by disagreements about a tag location that cannot be resolved by assigning a new turn-around-time for the tag to return a signal, these spurious paths may be mathematically modeled and stored for tags near this location. Processing begins in decision block 1034.

In decision block 1034 a determination is made as to whether or not RFID tag 102 has been previously read. If the resultant is in the affirmative that is the RFID tag 102 has previously been read then processing moves to block 1038. If the resultant is in the negative that is the RFID tag 102 has not been read then processing moves to block 1036.

In block 1036 correction factors are determined based in part on previous measurements, data, readings, and other factors. Processing then moves to block 1040.

In block 1038 previous correction factors associated with the RFID tag 102 are retrieved. Processing then moves to block 1040.

In block 1040 the correction factors are applied to the iterative current data readings. Processing then moves to block 1042.

In block 1042 the distances, directions, and or time-of-flight factors are adjusted based in part on the correction factors. Processing then moves to block 1044.

In block 1044 the newly determined correction factors are associated with the RFID tag 102 and stored for future use. Processing then moves back to block 1010.

Figure 5F:
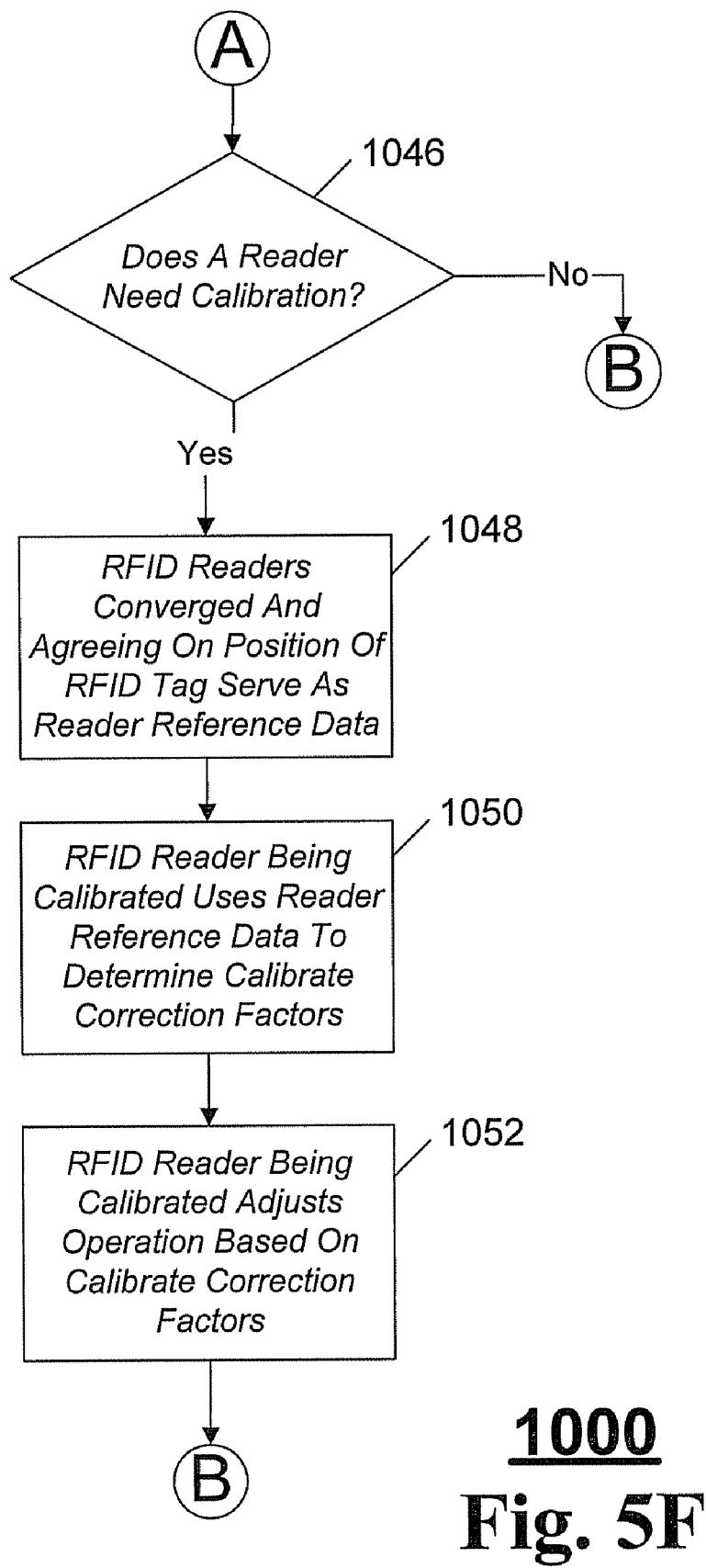
FIG. 5F illustrates one example of a routine to calibrate an RFID reader.

Referring to FIG. 5F there is illustrated one example of a routine to calibrate an uncalibrated RFID reader. In an exemplary embodiment, a known good spatial location of an RFID tag 102 in combination with predetermined correction factors for a plurality of RFID readers 202 enable a newly introduced, mobile, moved, or otherwise uncalibrated RFID reader to be auto calibrated. To clarify a system of RFID readers 202 converged and agreeing on the location of an RFID tag 102 can be used as reference data to a newly introduce, mobile, moved, or otherwise uncalibrated RFID reader 202. This auto calibration feature increases the accuracy of determining the spatial location of RFID tag 102 as well as speeds system calibration. Processing begins in decision block 1046.

In decision block 1046 a determination is made as to whether or not an RFID reader 202 needs to be calibrated. If the resultant is in the affirmative that is an RFID reader 202 needs to be calibrated then processing moves to block 1048. If the resultant is in the negative that is an RFID reader 202 does not need to be calibrated then processing returns to block 1010.

In block 1048 the plurality of RFID readers 202 converged and agreeing on the spatial location of RFID tag 102 provide reader reference data to be used to calibrate the newly introduced, mobile, moved, and or otherwise uncalibrated RFID reader 202. Processing then moves to block 1050.

In block 1050 the newly introduced, mobile, moved, and or otherwise uncalibrated RFID reader 202 needing calibration uses the reader reference data to determine calibration and correction factors. Processing then moves to block 1052.

In block 1052 the newly introduced, mobile, moved, and or otherwise uncalibrated RFID reader 202 needing calibration is calibrated and adjust, and as necessary operational parameters based in part on the reference data and other calibration data are changed. Processing then moves back to block 1010.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements, which fall within the scope of the claims, which follow. These claims should be construed to maintain the proper protection for the invention first described.

What is claimed is:

1. A method of spatially locating RFID tags, said method comprising:
    transmitting a request signal from at least one of a plurality of RFID readers;
    receiving an RFID tag response signal at said plurality of RFID readers;
    determining a plurality of time-of-flight factors;
    determining a plurality of correction factors;
    adjusting said plurality of time-of-flight factors by applying said plurality of correction factors to said plurality of time-of-flight factors;
    determining based in part on said plurality of time-of-flight factors a plurality of distances between each of said plurality of RFID readers and said RFID tag; and
    determining based in part on said plurality of distances the spatial location of said RFID tag.

2. The method in accordance with claim 1, wherein determining a plurality of time-of-flight factors includes determining the time period between sending said request signal from at least one of said plurality of RFID readers and receiving said RFID response signal at each of said plurality of RFID readers.

3. The method in accordance with claim 1, further comprising:
    retrieving previously stored said plurality of correction factors.

4. The method in accordance with claim 1, further comprising:
    measuring signal strength of said RFID tag response signal.

5. The method in accordance with claim 1, further comprising:
    associating said plurality of correction factors with said RFID tag data.

6. The method in accordance with claim 5, wherein associating said plurality of correction factors with said RFID tag data includes storing said plurality of correction factors and said RFID tag data at a networked data processing resource.

7. The method in accordance with claim 1, further comprising:
    decoding said RFID tag response signal to determine an identification code associated with said RFID tag.

8. The method in accordance with claim 7, further comprising:
    retrieving previously stored said plurality of correction factors associated with said identification code.

9. The method in accordance with claim 8, wherein said identification code is at least one of the following:
    i) said RFID tag serial number;
    ii) said RFID tag model number;
    iii) said RFID tag manufacturer number; or
    iv) said RFID tag data;
    v) an implicit ID based on a record of a tag previously near this location suggesting that the tag now observed may be the same tag as the previous tag there.

10. The method in accordance with claim 1, further comprising:
    calculating said plurality of correction factors based on said plurality of time-of-flight factors and said RFID tag response signal strength.

11. The method in accordance with claim 1, further comprising:
    synthesizing valid said plurality of RFID readers data, when said plurality of RFID readers data is determined to be invalid, by replacing said plurality of RFID readers invalid data with previously valid said plurality of RFID readers data.

12. The method in accordance with claim 1, further comprising:
    calibrating an uncalibrated RFID reader by using said RFID tag and data from said plurality of RFID readers, wherein said plurality of RFID readers are converged on the spatial location of said RFID tag.

13. The method in accordance with claim 1, wherein said RFID tag implements a two-axis non-planar antenna with the RFID tag using the antennas together at the same time or by switching successively between them to obtain the best send/receive signal strength to the reader.

14. The method in accordance with claim 1, wherein said RFID tag implements a three-axis non-planar antenna with the RFID tag using the antennas together at the same time or by switching successively between them to obtain the best send/receive signal strength to the reader.

15. The method in accordance with claim 1, wherein said RFID tag response signal is a precisely timed radio pulse.

16. The method in accordance with claim 1, wherein each of said plurality of RFID readers further comprising a directional antenna.

17. The method in accordance with claim 1, wherein said plurality of distances determinations is influenced by at least one of said plurality of RFID readers having a directional antenna.

18. The method in accordance with claim 1, wherein at least one on said plurality of RFID readers data communicate with a global network based data processing resource.

19. The method in accordance with claim 1, wherein each of the determining and adjusting is performed at a network based data processing resource.

20. A method of spatially locating RFID tags, said method comprising:
    transmitting a request signal from at least one of a plurality of RFID readers;
    receiving an RFID tag response signal at said plurality of RFID readers;
    determining a plurality of time-of-flight factors;
    determining a plurality of correction factors;
    adjusting said plurality of time-of-flight factors by applying said plurality of correction factors to said plurality of time-of-flight factors;
    determining based in part on said plurality of time-of-flight factors a plurality of distances between each of said plurality of RFID readers and said RFID tag;
    determining based in part on said plurality of distances the spatial location of said RFID tag;
    detecting disagreements between said plurality of readers as to the presumed spatial location of said RFID tag resultant from reflected signal paths; and
    adjusting for spurious distances resultant from reflected signal paths by using mathematically modeled and saved RFID tag spatial location data near the determined said RFID tag spatial location.

\* \* \* \* \*